US008065365B2

(12) United States Patent
Saxena et al.

(10) Patent No.: US 8,065,365 B2
(45) Date of Patent: Nov. 22, 2011

(54) GROUPING EVENT NOTIFICATIONS IN A DATABASE SYSTEM

(75) Inventors: Abhishek Saxena, Belmont, CA (US); Neerja Bhatt, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 631 days.

(21) Appl. No.: 11/743,276

(22) Filed: May 2, 2007

(65) Prior Publication Data

US 2008/0275956 A1   Nov. 6, 2008

(51) Int. Cl.
*G06F 15/16* (2006.01)

(52) U.S. Cl. ........ 709/204; 709/223; 709/224; 709/225; 709/226; 702/84; 705/2; 705/3; 705/4; 705/5; 705/6; 707/749; 707/750

(58) Field of Classification Search .................... 70/229; 702/84; 705/2–14; 707/200; 711/154; 719/318
See application file for complete search history.

(56) References Cited

U.S. PATENT DOCUMENTS

| | | | |
|---|---|---|---|
| 5,717,745 A | | 2/1998 | Vijay et al. |
| 5,721,825 A | * | 2/1998 | Lawson et al. ................ 709/203 |
| 5,999,978 A | * | 12/1999 | Angal et al. ................... 709/229 |
| 6,185,613 B1 | * | 2/2001 | Lawson et al. ................ 709/224 |
| 6,336,139 B1 | * | 1/2002 | Feridun et al. ................ 709/224 |
| 6,367,034 B1 | * | 4/2002 | Novik et al. .................... 714/39 |
| 6,470,223 B1 | * | 10/2002 | Naganuma ....................... 700/9 |
| 6,477,558 B1 | * | 11/2002 | Irving et al. .................. 718/100 |
| 6,477,585 B1 | * | 11/2002 | Cohen et al. .................. 719/318 |
| 6,697,810 B2 | * | 2/2004 | Kumar et al. ....................... 1/1 |
| 6,829,639 B1 | * | 12/2004 | Lawson et al. ................ 709/224 |

(Continued)

FOREIGN PATENT DOCUMENTS

EP       1351446 A1 * 10/2003

OTHER PUBLICATIONS

"Create Trigger" downloaded May 2, 2007 from Internet < http://oracle-docs.dartmouth.edu/dba-docs/10gdoc/server.101/b10759/statements_7004.htm > 16 pages.

(Continued)

*Primary Examiner* — John Follansbee
*Assistant Examiner* — Backhean Tiv
(74) *Attorney, Agent, or Firm* — Hickman Palermo Truong & Becker LLP; Daniel D. Ledesma

(57) ABSTRACT

Techniques for grouping events in a computing system are provided. A registrant sends, to a database server, a request to register to receive a single notification based the occurrence of multiple events that satisfy certain criteria, referred to as grouping attributes. Such registrations are referred to as grouping registrations. An eventing mechanism in the database server receives and maintains grouping registrations. When an event is received, the eventing mechanism determines whether the event has been registered for in an active grouping registration, i.e., one whose start time has passed but whose completion criteria are not yet satisfied. If so, then the eventing mechanism updates grouping data associated with the grouping registration. When the completion criteria of a grouping registration are satisfied, the eventing mechanism sends a notification to the registrant and/or other intended recipient(s). The notification may provide a summary of all the events in the group or provide details about a single event from the group, such as the latest event.

32 Claims, 3 Drawing Sheets

U.S. PATENT DOCUMENTS

| | | | |
|---|---|---|---|
| 6,857,017 B1* | 2/2005 | Faour et al. | 709/224 |
| 6,901,447 B2 | 5/2005 | Koo et al. | |
| 6,920,468 B1* | 7/2005 | Cousins et al. | 1/1 |
| 6,963,882 B1* | 11/2005 | Elko et al. | 1/1 |
| 7,107,328 B1* | 9/2006 | Muthiyan et al. | 709/220 |
| 7,133,903 B2* | 11/2006 | Yoshii et al. | 709/217 |
| 7,146,416 B1* | 12/2006 | Yoo et al. | 709/224 |
| 7,213,068 B1* | 5/2007 | Kohli et al | 709/225 |
| 7,290,077 B2 | 10/2007 | Gregg et al. | |
| 7,392,306 B1* | 6/2008 | Donner et al. | 709/224 |
| 7,403,901 B1* | 7/2008 | Carley et al. | 705/2 |
| 7,441,429 B1* | 10/2008 | Nucci et al. | 70/229 |
| 7,451,162 B2* | 11/2008 | Hess | 1/1 |
| 7,461,043 B2* | 12/2008 | Hess | 706/46 |
| 7,502,972 B1* | 3/2009 | Chilukuri et al. | 714/45 |
| 7,516,208 B1* | 4/2009 | Kerrison et al. | 709/224 |
| 7,526,322 B2* | 4/2009 | Whistler | 455/566 |
| 7,568,232 B2* | 7/2009 | Mitomo et al. | 726/25 |
| 7,721,297 B2* | 5/2010 | Ward | 719/318 |
| 2003/0018530 A1* | 1/2003 | Walker et al. | 705/14 |
| 2003/0172060 A1* | 9/2003 | Uchikado | 707/3 |
| 2003/0182464 A1 | 9/2003 | Hamilton et al. | |
| 2003/0212518 A1* | 11/2003 | D'Alessandro et al. | 702/84 |
| 2004/0034640 A1 | 2/2004 | Jain et al. | |
| 2005/0021740 A1* | 1/2005 | Bar et al. | 709/224 |
| 2006/0004597 A1* | 1/2006 | Charters et al. | 705/1 |
| 2006/0149787 A1 | 7/2006 | Surlaker et al. | |
| 2007/0011207 A1* | 1/2007 | Vishnubhotla | 707/200 |
| 2007/0136245 A1* | 6/2007 | Hess et al. | 707/3 |
| 2007/0220215 A1* | 9/2007 | Mizutani et al. | 711/154 |
| 2007/0294352 A1* | 12/2007 | Shraim et al. | 709/206 |
| 2007/0299701 A1* | 12/2007 | Boyer et al. | 705/5 |
| 2008/0184267 A1* | 7/2008 | Hochmuth | 719/318 |
| 2008/0209280 A1* | 8/2008 | Dilillo et al. | 714/48 |
| 2008/0275956 A1* | 11/2008 | Saxena et al. | 709/206 |

OTHER PUBLICATIONS

U.S. Appl. No. 11/777,783, filed Jul. 13, 2007, Office Action, mailed Jun. 13, 2011.

* cited by examiner

GROUPING EVENT NOTIFICATIONS IN A DATABASE SYSTEM

FIELD OF THE INVENTION

The present invention relates to grouping events in a database system and providing a single notification for the group of events.

BACKGROUND

Database administrators would like to monitor the status of the database systems they manage for various reasons. For example, administrators want to ensure that their respective database systems are constantly up and running and, if not, that any performance issues are handled promptly and swiftly so that users of the database systems are not adversely affected.

The users may be, for example, employees of a company. The database system may comprise proprietary information of the company. The employees require constant access to the proprietary information in order to perform their duties. Unresponsive or slow database systems in this context translate into lost money for the company.

As another example, the users may be online shoppers. The database system may comprise product information that the users may search via a web browser. Unresponsive or slow database systems in this context may cause some users to not purchase any items that they would have otherwise purchased. Worse still, some users may not return to the website because of the website's unresponsiveness. Less traffic to the website generally translates into lost revenue for the owner of the website.

Whatever the context, administrators of such database systems would prefer to be notified of any potential problems before the problems materialize and adversely affect user experience.

One approach that designers of database systems may implement so that administrators may monitor the status of their respective database systems is an eventing mechanism. An eventing mechanism included in a database system may allow an administrator to register for certain events. Examples of database events that may be of interest include, without limitation, updates to a certain table, the creation of an index, the size of a certain table after an update, the number of transactions within a certain time period, and the number of updates to a certain table within a certain time period. For each occurrence of an event for which a registration has been submitted, a separate notification is sent to the administrator that indicates that the event occurred.

However, one problem with such an approach is that a large number of events for which an administrator has registered may occur in the database system. As a result, the administrator may be overwhelmed with the resulting large number of event notifications that the administrator receives.

Based on the foregoing, there is a need to provide a mechanism for providing enough information to database administrators (or other users interested in events that occur in a computing system) so that they are notified of events without overwhelming the administrators with too many notifications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
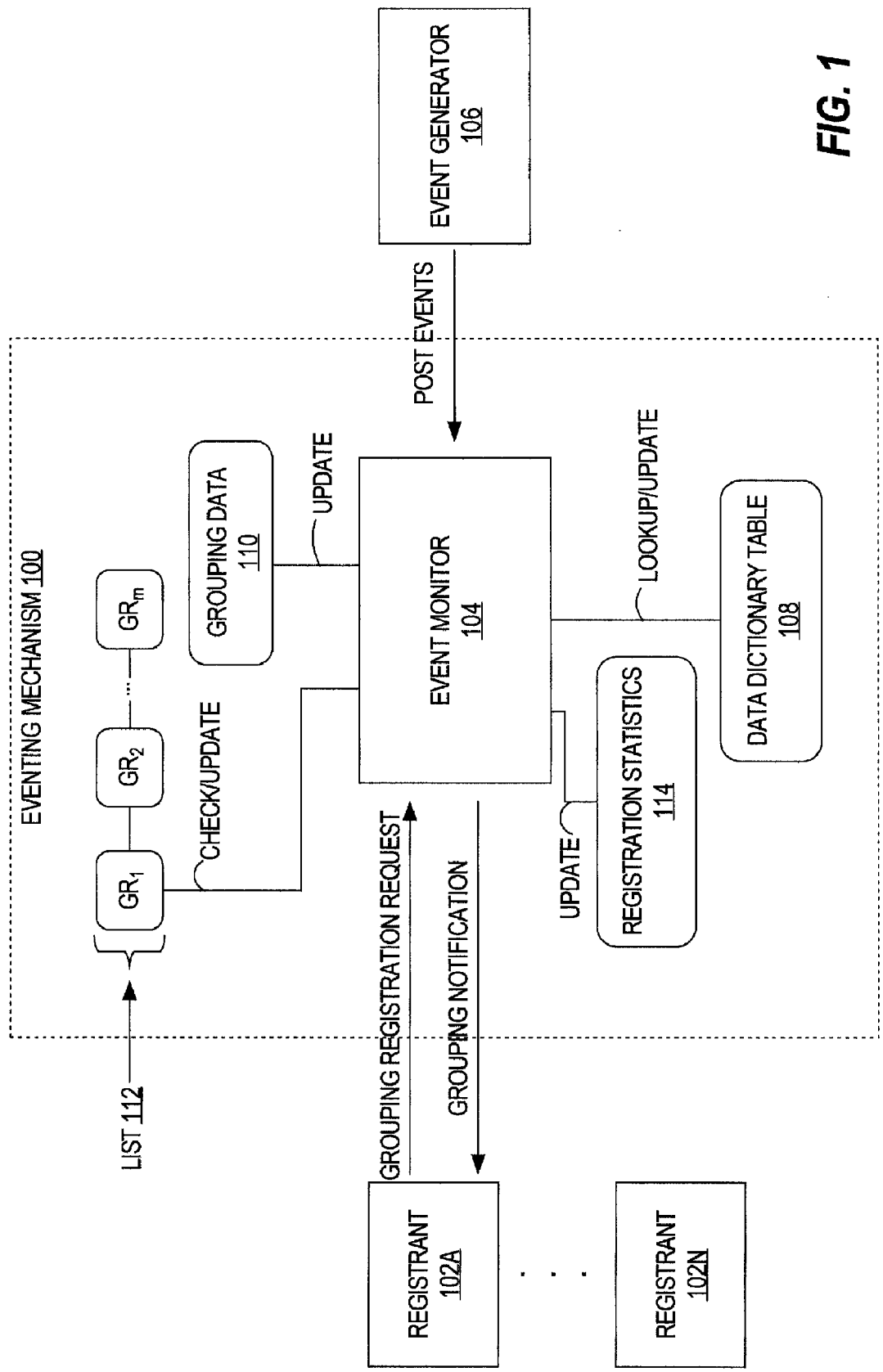
FIG. 1 is a block diagram that illustrates an example eventing mechanism, according to an embodiment of the invention.

In the following description, for the purposes of explanation, numerous specific details are set forth in order to provide a thorough understanding of the present invention. It will be apparent, however, that the present invention may be practiced without these specific details. For example, embodiments of the invention are described in the context of a database system. However, embodiments of the invention may be practiced in any computing system. In other instances, well-known structures and devices are shown in block diagram form in order to avoid unnecessarily obscuring the present invention.

General Overview

According to an embodiment of the invention, an administrator issues a request to register for a single notification that represents a group of events that each satisfies one or more grouping criteria. Such a request is referred to hereinafter as a "grouping registration request."

An eventing mechanism receives and maintains grouping registration requests. When an event is received, the eventing mechanism determines whether the event has been registered for in an "active" grouping registration. If so, then the eventing mechanism updates grouping data that are associated with the grouping registration. When completion criteria associated with a grouping registration is satisfied, a notification is sent to the registrant and/or other intended recipient(s). The notification may provide a summary of all the events in the group or provide details about a single event from the group, such as the latest event.

Additional Definitions

The events that satisfy the one or more grouping criteria of a grouping registration are referred to hereinafter as "grouping registration events."

Each grouping registration is associated with one or more "completion criteria", which may or may not be specified in a grouping registration request. A completion criterion indicates when grouping events for a single notification may cease.

In response to the completion criteria of a grouping registration being satisfied, a notification is sent to one or more intended recipients. Such a notification is referred to hereinafter as a "grouping notification."

An "event" may be any occurrence of interest in a database system, whether that occurrence is a change to a file or object managed by the database system, or the amount of consumed shared memory in the database system at a particular point in time. Additionally, an event may be the lack of activity. For example, an administrator may register to be notified if a table is not accessed within a certain specified period of time.

As an example of a grouping registration request, an administrator might desire to be notified once every ten minutes if a new message from user U is enqueued in a queue Q in a database during that period. In this example, the grouping criteria that an event must satisfy in order to be a grouping registration event are (1) a new message (2) from user U (3) that is enqueued in queue Q. The completion criterion is the occurrence of at least one such event in a 10-minute period. If at least one such event does not occur in the 10-minute period, then a grouping notification is not sent. If one or more such events occur in the 10-minute period, then one grouping notification is sent at the end of the 10-minute period, regardless of whether two or one hundred grouping registration events occurred in that period.

Example Eventing Mechanism

FIG. 1 is a block diagram that illustrates an example eventing mechanism 100, according to an embodiment of the invention. Eventing mechanism 100 may execute in the context of any computing architecture. For example, eventing mechanism 100 may be part of a database server that manages data stored in a database.

Registrants

FIG. 1 illustrates that there may be multiple registrants 102A-102N. As used hereinafter, "registrant" refers to the user that issues a grouping registration request. Registrants 102A to 102N may use any mechanism for issuing a grouping registration request. The actual hardware and/or software components that communicate a grouping registration request to eventing mechanism 100 may include, without limitation, an application or an application server. A registrant may issue a grouping registration request from any computing device, such as a mobile phone, PDA, laptop computer, or a desktop computer.

Event Monitor

As illustrated in FIG. 1, eventing mechanism 100 comprises an event monitor 104, which may be implemented as a single process or multiple processes (which is described in more detail below). Event monitor 104 may execute as a background server process at a database server (not shown).

Event monitor 104 processes group registration requests from registrants 102A-102N. Event monitor 104 may also process non-grouping registration requests, i.e., requests to be notified separately for each event that satisfies criteria specified in the request.

Event Generator

FIG. 1 also illustrates an event generator 106 that generates events and provides (posts) the events to event monitor 104. Event generator 106 may be any process that tracks changes in a computing system. Alternatively, event generator 106 may be any process that makes changes to the computing system. For example, event generator 106 may be a process that enqueues a message and a process that dequeues a message. As another example, event generator 106 may be a process that updates a table or an index in a database. Therefore, in addition to executing a user request or a system request, a particular process also provides the event(s) to event monitor 104. An event may be in the form of a record that indicates various information depending on the type of event. For example, if the event is an update to a table, then the record may indicate the following: (a) update row r of table T, (b) at time t, and (c) the size of T as a result of the update is X.

Communications links between registrants 102A-102N, eventing mechanism 100, and event generator 106 may be implemented by any medium or mechanism that provides for the exchange of data. Examples of communications links include, without limitation, a network such as a Local Area Network (LAN), Wide Area Network (WAN), Ethernet or the Internet, or one or more terrestrial, satellite, or wireless links.

Data Dictionary Table

Eventing mechanism 100 also comprises a data dictionary table 108 that maintains data about each grouping registration request and, optionally, each non-grouping registration request. For example, the data for a particular registration request may indicate a registration identifier that uniquely identifies the registration, a name (e.g., of a queue subscriber or generated internally for a user that registers on changes to a table), a namespace, how to present the notification to the registrant, the time of the registration, and any criteria specified in the registration request.

A namespace of a registration refers to a category of registration based on the type of event. Examples of namespaces include (1) Advanced Queuing (AQ), which includes Oracle Streams Events (such as enqueue to a queue); (2) DB Change, which includes Continuous Query Events (such as changes to a table); and (3) Anonymous, which includes explicitly posting registrants (such as an application communicating with another application by posting events to it).

Data dictionary table 108 may include additional information about what do to when the completion criteria of a grouping registration are satisfied or when an event for a non-grouping registration occurs. For example, the information may be location information, such as a host and port number for OCI (Oracle Call Interface) clients. Location information is used to send a notification to the intended recipient(s). A registration request may specify one or more recipients of a future notification. As a result, those recipients will receive the notification when the appropriate event(s) occur.

As another example, the additional information may be the name of a PL/SQL procedure that is stored in a database. The PL/SQL procedure is executed when the completion criteria of the corresponding registration are satisfied.

In an embodiment, a registration is maintained in data dictionary table 108 only as long as the corresponding registration is still "active." An active registration is one for which events are still being collected. In the context of grouping registrations, an active grouping registration is one in which a start time associated with the registration has past and in which a repeat count associated with the registration is not yet exhausted. The start time and repeat count of a grouping registration is discussed in more detail below. Once a registration becomes inactive, then the information about the registration is removed from data dictionary table 108 or at least "marked" (e.g., setting a Boolean "active" attribute to false) to indicate that the registration is inactive.

Grouping Data

Event monitor 104 maintains grouping data 110 for each grouping registration, which may be stored in shared memory. Thus, each grouping registration has its own grouping data 110. Grouping data 110 may be implemented as a list, where each entry in the list corresponds to one or more events. Thus, when an event occurs, a new entry may be created and added to the appropriate list or an existing entry may be updated.

When the completion criteria of a grouping registration are satisfied, a notification (including a subset of the corresponding grouping data) is sent, and the corresponding grouping data may be deleted.

The level of detail for grouping data 110 of a grouping registration may depend on the registrant's intent. For example, if the registrant specified that s/he only wanted details about the last event, of a plurality of grouping registration events, that occurred, then grouping data 110 for that registration might not be maintained at all. As another example, a grouping registration request may indicate that the registrant desires to be notified once every ten minutes if at least two updates to table T were issued during that period. The notification may simply indicate that 3 updates to table T were issued during a particular 10-minute period. Thus, the corresponding grouping data might only indicate as much.

If an event that satisfies the grouping criteria of one or more grouping registrations occurs, then event monitor 104 updates the grouping data that correspond to the one or more grouping registrations.

In an embodiment, each entry in data dictionary table 108 that corresponds to a different grouping registration includes a reference. The event monitor 104 may use the reference to access grouping data 110 that corresponds to a grouping registration. Thus, the reference allows for a more efficient update of grouping data 110.

List

According to an embodiment, event monitor 104 maintains a list 112. Each entry in list 112 indicates when the completion criteria of a different grouping registration will be satisfied. Event monitor 104 adds entries to list 112 upon the receipt of each grouping registration request. Event monitor 104 removes entries from list 112 when event monitor 104 determines that the completion criteria of the corresponding grouping registrations are satisfied.

List 112 may be unordered, especially if the completion criteria of a grouping registration is not time-based. However, even if the one or more completion criteria of a grouping registration are not time-based, list 112 may be ordered.

In one embodiment, two lists 112 are maintained: a time-based list 112A for time-based grouping registrations and a non-time-based list 112B for non-time-based grouping registrations. Time-based list 112A is ordered by the next grouping notification send time. Non-time based list 112B is ordered by "expected" next grouping notification send time. The "expected" next grouping notification send time is expressed as a Grouping Value Percentage (GVP). Each grouping registration is associated with a GVP, which is defined as:

$$GVP = current\ grouping\ value\ (CGV)/specified\ grouping\ value\ (SGV) * 100$$

Thus, the first entry in list 112B has the highest GVP value, followed by an entry with the next highest GVP value, and so forth.

Upon every grouping data update, the GVP, of the corresponding grouping registration, in non-time-based list 112B is updated and the entry in list 112B may be placed in a new position based on its new GVP.

Thus, the non-time based grouping is different from time-based grouping in the sense that the former may be ordered by the time dimension but the latter has different dimensions whose progression rate are not available separately but depend on grouping data updates. To keep GVPs updated and the non-time-based list 112B ordered by GVP, each entry in non-time-based list 112B will have a reference to its CGV in registration statistics 114 besides the SGV. Whenever a grouping data 110 is updated, a callback will update the appropriate entry in non-time-based list 112B. This scheme may work for all grouping criteria.

As an example of two simultaneously-maintained lists 112, suppose there are four grouping registrations: (1) one for grouping class "time" with grouping value (10 min), (2) one for grouping class "time" with grouping value (15 min), (3) one for grouping class "size" with grouping value (10 KB); and (4) one for grouping class "transactions" with grouping value (10). Time-based list 112A maintains grouping registrations (1) and (2) ordered by next grouping notification send time.

Non-time-based list 112B may be as follows: grouping registration (3) has grouped 2 KB of grouping data (GVP=20%) and grouping registration (4) has grouped five transactions (GVP=50%). Therefore, non-time-based list 112B will have grouping registration (4) followed by grouping registration (3).

Note that if time-based list 112A is maintained separate from non-time based list 112B, then time-based list 112B is not required to be updated as time progresses. If only one list 112 is maintained for all grouping registrations, then the time-based elements will have to be updated continuously because time is the dimension for time-based registrations and it progresses continuously.

Alternatively, if completion criteria is maintained in data dictionary table 108, then list 112 may not be required. Instead, event monitor 104 may check (upon the receipt of each event from event generator 106) the completion criteria associated with each grouping registration in data dictionary table 108.

Registration Statistics

According to an embodiment, event monitor 104 maintains registration statistics 114. Registration statistics 114 may maintain statistics pertaining to all registrations, including non-grouping registrations. Registration statistics 114 may be maintained as a list in shared memory.

Registration statistics 114 may include any type of information about registrations, such as (a) how many registrations have been received, (b) how many notifications have been sent, (c) when was the last notification sent, (d) latency of event monitor 104, etc.

Such statistics may be maintained for many reasons. For example, a database administrator may query registration statistics 114 to determine how often a particular index was utilized when executing database statements. As another example, a database administrator may query registration statistics 114 to determine how many messages were enqueued to a particular queue. As another example, registration statistics 114 may be used internally by the computing system to automatically perform one or more operations when a registration statistic exceeds a particular threshold value.

In an embodiment, each entry in data dictionary table 108 (corresponding to a different registration) includes a reference to registration statistics 114 for that grouping registration. Event monitor 104 uses the reference in data dictionary table 108 to access and update registration statistics 114. This reference optimizes the statistics update which otherwise would involve searching all the statistics.

In an embodiment, registration statistics 114 of a grouping registration includes a reference to grouping data 110 for that grouping registration. Event monitor 104 uses this reference to quickly access and update grouping data 110 upon the occurrence of an applicable event.

Grouping Attributes

A grouping registration request is processed according to one or more criteria. Each criterion of the one or more criteria is referred to hereinafter as a "grouping attribute." A grouping attribute informs an eventing mechanism about how to process the corresponding registration request. A grouping registration request typically specifies at least one grouping attribute. Some grouping attributes may be specified in the registration request while other grouping attributes may be assigned default values, which may be configurable by a user/administrator of the database system.

Examples of grouping attributes that may be associated with each grouping registration request may include, but are not limited to: (1) class, (2) value, (3) type, (4) start time, and (5) repeat count.

"Class" refers to one or more criteria for grouping. Examples of values for the class attribute include, without limitation, time, transaction, event, and size. If an event that belongs to a class that is specified in an active grouping registration occurs, then the grouping data associated with that grouping registration is updated. The values of one or more class attributes are the one or more "grouping criteria" referred to above.

"Value" refers to a value for a grouping criterion. For example, if the class attribute value of a grouping registration request is "time," then a value for the value attribute may be a number of seconds. As another example, if the class attribute value of a grouping registration request is a particular transaction, then a value for the value attribute may be a number of such transactions. The values of one or more value attributes are the one or more "completion criteria" referred to above.

If the grouping registration does not specify a value attribute, then a default value for the value attribute may depend on the value of the class attribute. For example, if the value of the class attribute is "time," then the default value of the value attribute may be ten minutes. As another example, if the value of the class attribute is "transaction," then the default value of the value attribute may be twenty transactions.

"Type" refers to the format of a grouping notification that results from the grouping registration. For example, a value of the type attribute may be "summary," which indicates that the grouping notification will provide a summary of the events that satisfy the grouping criteria. For a group of messages enqueued to a queue, a summary may contain the message identifiers of all the messages in the group. For a group of rows in a table, a summary may contain the row identifiers of all rows updated in the group.

As another example of a value of the type attribute, a value of the type attribute may be "last," which indicates that the grouping notification will provide details only about the last event that satisfies the grouping criteria. An example of a default value for the type attribute is "summary."

"Start time" refers to a time to begin grouping events that satisfy the one or more grouping criteria. For example, a value of the start time attribute might be Jul. 1, 2007, 12:00 AM, which indicates that events will not be grouped for the corresponding grouping registration until that date and time. If the grouping registration does not specify a start time, then a default value for the start time attribute may be the current time, indicating that the registrant intended the grouping to begin immediately. Before the start time of a grouping registration, the grouping registration may be treated as a non-grouping registration.

"Repeat count" refers to a number of times to perform grouping according to the one or more grouping criteria. For example, if the grouping registration specifies "6" for the repeat count, then the registrant will receive six grouping notifications for six sets of events that occurred in six different time intervals. If the grouping registration does not specify a repeat count, then a default value for the repeat count attribute may be a value indicating infinity, indicating that the registrant intended to receive grouping notifications indefinitely. After the repeat count of a grouping registration becomes zero, the grouping registration may be treated as a non-grouping registration.

Flow Diagram

Figure 2:
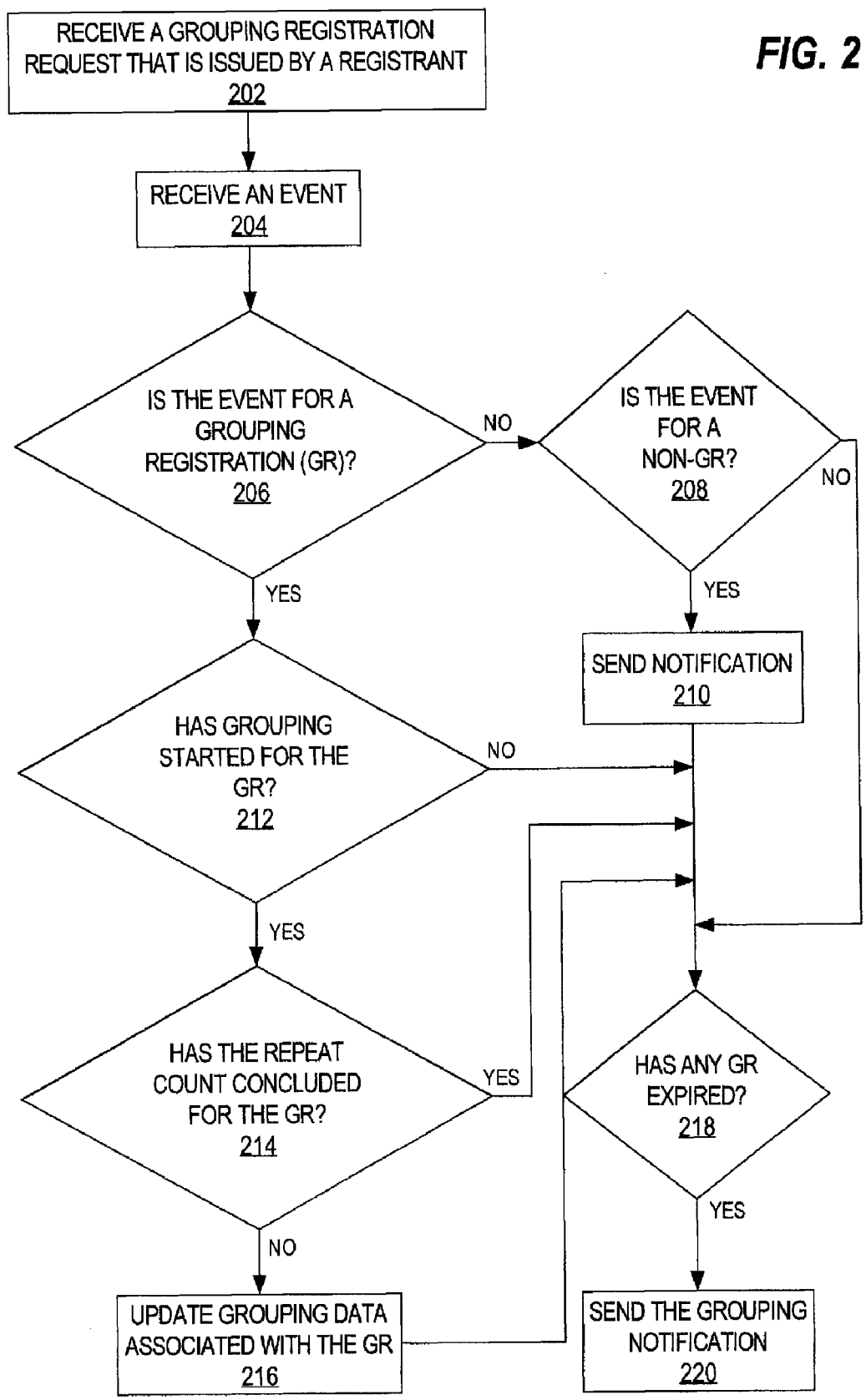
FIG. 2 is a flow diagram that illustrates how an event is processed by an eventing mechanism, according to an embodiment of the invention.

FIG. 2 is a flow diagram that illustrates how an event is processed by an eventing mechanism, according to an embodiment of the invention. The flow diagram is described in the context of the elements of FIG. 1, although other elements not shown may perform the same (or similar) functionality.

At step 202, event monitor 104 receives a grouping registration request that is issued by registrant 102A. The request specifies one or more grouping criteria.

At step 204, event monitor 104 receives an indication, from event generator 106, that an event has occurred.

At step 206, event monitor 104 determines whether a registrant has registered for the event in a grouping registration request. This determination may be performed by accessing data dictionary table 108. If a registrant has not registered for the event in a grouping registration request, then the process proceeds to step 208.

At step 208, event monitor 104 determines whether a registrant has registered for the event in a non-grouping registration request. (This determination may also be performed by accessing data dictionary table 108.) If not, then the event may be ignored by event monitor 104 and control passes to step 218.

However, if the determination at step 208 is in the affirmative, then, at step 210, a notification is sent to one or more users. Additionally or alternatively, an operation (other than the generating and sending of the notification) is initiated in response to the affirmative determination.

If (at step 206) event monitor 104 determines that a registrant has registered for the event in one or more grouping registration requests (referred to hereinafter as target grouping registrations), then control passes to step 212. Alternatively, if the embodiment in which data dictionary table 108 only maintains active registrations is implemented, then the control proceeds from step 206 to step 216.

At step 212, event monitor 104 determines whether a grouping has begun for any of the target grouping registrations. If not, then the event is ignored. Control may proceed to step 218. If event monitor 104 determines (at step 212) that a grouping has begun for any of the target grouping registrations, then control proceeds to step 214.

At step 214, event monitor 104 determines whether a repeat count has concluded for any of the target grouping registrations. If so, then control proceeds to step 218. If not, then control proceeds to step 216.

At step 216, event monitor 104 updates, based on the event, grouping data 110 that are associated with each target grouping registration. Control then proceeds to step 218.

At step 218, event monitor 104 determines whether the one or more completion criteria for any grouping registration are satisfied. If so, then, at step 220, a grouping notification is sent for each grouping registration whose one or more completion criteria are satisfied.

Event Monitor Parallelization

According to an embodiment, event monitor 104 is parallelized by executing multiple slave processes. For example, a different slave process may process certain grouping registration requests by using an identifier that is associated with each grouping registration. The identifier is hashed and the resulting value is associated with a particular slave process. Each slave process is associated with a different set of one or more grouping registrations.

When event generator 106 posts events to event monitor 104, any slave process may use the event to check data dictionary table 108, update registration statistics 114, and update grouping data 110. Alternatively, a slave process may be allowed to update only the grouping data of grouping registrations with which the slave process is associated.

In an embodiment, slave processes check list 112 to determine whether the completion criteria of a grouping registration are satisfied. In this embodiment, list 112 comprises multiple lists, referred to as mini-lists. Each mini-list is maintained and checked by a different slave process with which the mini-list is associated (or, to which the mini-list is assigned). Thus, there is a one-to-one mapping between a mini-list and a slave process.

Alternatively, a separate process may be designated as the sole process for checking list 112 to determine if completion criteria of any grouping registration are satisfied. In this latter case, list 112 is a single list (or two lists—list 112A and list 112B, discussed above).

Timeout

According to an embodiment, a registration request (either grouping or non-grouping) may specify a timeout value. A timeout value is separate from the one or more completion criteria associated with a grouping registration. A "timeout" takes precedence over a grouping repeat count. Thus, if a timeout occurs in the middle of a grouping value period, then event monitor 104 drains the grouping data of the corresponding registration and sends an early grouping notification before removing the registration.

Unregister

According to an embodiment, a registration request (either grouping or non-grouping) may be "unregistered". A registration that is unregistered is one where the registrant sends a request to delete the registration. Like a timeout, an "unregistration" takes precedence over a grouping repeat count. Thus, if an unregistration occurs in the middle of a grouping value period, then event monitor 104 drains the grouping data of the corresponding registration and sends an early grouping notification before removing the registration.

Database Instance Shutdown

The database system in which eventing mechanism 100 executes may be distributed among a cluster of nodes. Each node executes a separate instance of a database server. Each database instance manages and shares access to a single database. In such an arrangement, it is not uncommon for one or more database instances to go down, for either planned or unplanned reasons. If a database instance is down (e.g., unable to process requests for data from the database), then the grouping data maintained by that database instance should be accounted for.

Therefore, according to an embodiment, upon a database shutdown, the grouping data is drained and grouping notifications are sent for each active grouping registration. Also, information in data dictionary table 108 is sent to at least one running (receiving) database instance. Additionally, list 112 and grouping data 110 are initialized on the receiving database instance and grouping data is begun anew.

Furthermore, the original start time is modified for each grouping registration that has a time-based grouping value. The start time may be modified, e.g., by adding the product of n x grouping value to the original start time, where n is the smallest integer that causes the result to be greater than or equal to the current time. This modification is performed because the registrant is expecting a grouping notification at a certain time and event monitor 104 on the receiving database instance should not be immediately sending notifications.

After sending the grouping notifications, the next send time for each grouping registration is updated atomically, in list 112, with send. Also during register, registration statistics is initialized and grouping registration information is inserted in per slave list atomically with register. Atomicity ensures that any event monitor process deaths in the middle of such operations are properly recovered—rolled back or forward depending upon the current state—to a consistent state.

Recovery is ensured during grouping initialization (e.g., when adding a registration to data dictionary table 108), update (i.e., updating grouping data), and send (i.e., sending notifications) for process deaths. For example, a process monitor detects an event monitor process death and calls an event monitor recovery routine, which brings the event notification system to a consistent state and frees up any resources held by the "dead" process. Then, the process monitor starts an event monitor process and operations proceed from there.

Example Grouping Registration Requests

Based on the foregoing, a registrant may issue many types of grouping registrations. The following are examples of grouping registration requests. If a grouping attribute is not specified in the example, then it is assumed that a default value is used. For example, none of the examples specifies a value for the start time attribute. Thus, a default value is used, which typically would be as soon as the grouping registration is processed by the database system.

EXAMPLE 1

A registrant wants to be notified every time M messages arrive in queue Q for subscriber S. In this example, the grouping criteria that an event must satisfy are (1) a message (2) that arrives in queue Q (3) for subscriber S. The completion criterion is the number of such messages—M. The repeat count is indefinite (i.e., "every time").

EXAMPLE 2

A registrant wants to be notified every time table T increases in size by K kilobytes. In this example, the grouping criteria that an event must satisfy are (1) an update (2) to table T. The completion criterion is the number of kilobytes that table T increases—K. The repeat count is indefinite (i.e., "every time").

EXAMPLE 3

A registrant wants a colleague to be notified every time, for a hundred times, when S additional subscriptions are received for newspaper N. In this example, the grouping criteria that an event must satisfy are (1) a subscription (2) to newspaper N. The completion criterion is the number of such subscriptions—S. The repeat count is one hundred.

EXAMPLE 4

A registrant wants to be notified every fifteen minutes if at least one home run is hit during that 15-minute period. With each notification, the registrant wants information only about the last home run that is during that period. In this example, the grouping criterion is a home run. The completion criterion is at least one home run in a 15-minute period. If no home runs are hit in a 15-minute period, then a notification is not sent to the registrant. The value of the type attribute is "last." The repeat count is indefinite.

EXAMPLE 5

A registrant wants to be notified when user U has initiated ten bank transactions in a single day. With the notification, the registrant wants a summary of all the transactions. In this example, the grouping criteria that an event must satisfy are (1) a bank transaction (2) initiated by user U. The completion criterion is ten bank transactions in a single day. If user U does not initiate at least 10 transactions in a single day, then a notification is not sent to the registrant. Also, if user U does not initiate at least 10 transactions in a single day, then any accumulated grouping data is not included in a subsequent notification. For example, such accumulated grouping data may be deleted at the end of the day.

EXAMPLE 6

A registrant wants to be notified every time driver D is ticketed for three traffic violations. In this example, the grouping criteria that an event must satisfy are (1) a traffic violation (2) for driver D. The completion criterion is the number of such traffic violations—three. The repeat count is indefinite (i.e., "every time").

Benefits

Embodiments of the invention may provide a large number of applications in a database event notification market that is growing at an astonishing pace. There are numerous events of interest in a database for which applications, mobile users, application servers, websites, and other database components might want to be notified. Such events include (a) changes to database objects, e.g., tables, indexes, queues, and query result sets, and (b) posts by other applications and internal RDBMS components, e.g., high availability events and a manageability monitor process that monitors database manageability tasks (such as SQL statistics and data storage usage) and sends alert notifications. As the types and number of events of interest in a database increase, an overwhelmingly large number of notifications will result. Thus, grouping notifications can play a vital role to improve the quality of service and a much more user-friendly database experience.

Hardware Overview

Figure 3:
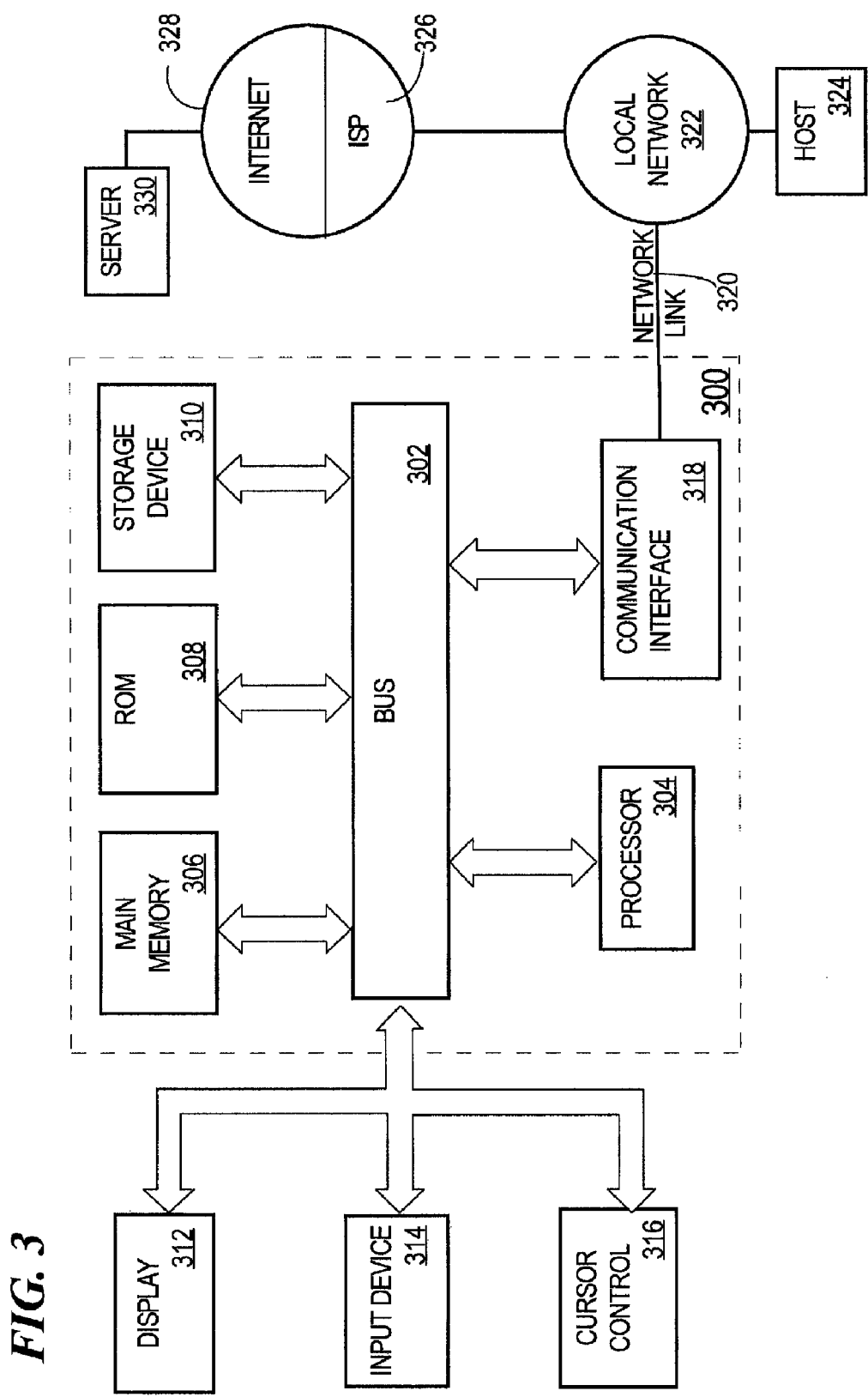
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving, at a computing device, a particular grouping registration from a registrant, wherein the particular grouping registration specifies one or more grouping criteria;
receiving event information about occurrences of a set of multiple events;
for a first event of the set of multiple events:
determining whether said first event is for a grouping registration or a non-grouping registration,
in response to determining that said first event is for a non-grouping registration, sending a notification of said first event to one or more intended recipients associated with the non-grouping registration, wherein details in the notification about said first event comprises a first level of detail;
for a second event of the set of multiple events:
determining whether said second event is for a grouping registration or a non-grouping registration, wherein determining whether said second event is for a grouping registration or a non-grouping registration comprises determining whether occurrence of said second event satisfies the one or more grouping criteria, and
in response to determining that occurrence of said second event satisfies the one or more grouping criteria, storing information, about occurrence of said second event, in association with the particular grouping registration instead of sending a notification of the occurrence of said second event;
wherein occurrence of each event of a plurality of events in the set of multiple events-satisfies the one or more grouping criteria;
determining whether one or more completion criteria, associated with the particular grouping registration, are satisfied; and
in response to determining that the one or more completion criteria are satisfied, sending a grouping notification to one or more intended recipients associated with the particular grouping registration;
wherein details in the grouping notification about said plurality of events comprises a second level of detail that is less than the first level of detail;
wherein the method is performed by one or more computing devices.

2. The method of claim 1, wherein the grouping notification is sent without sending any individual notifications of any event of the plurality of events.

3. The method of claim 1, wherein one of the one or more intended recipients is the registrant.

4. The method of claim 1, wherein the registrant issued the particular grouping registration through an application or application server that is executing in conjunction with a relational database management server (RDBMS).

5. The method of claim 1, wherein the one or more grouping criteria specifies at least one of time, transaction, event, or data size.

6. The method of claim 1, wherein the particular grouping registration specifies the one or more completion criteria.

7. The method of claim 1, wherein the one or more completion criteria are at least one of a length of time, a number of transactions, a number of bytes of one or more data objects, or a number of occurrences of an event.

8. The method of claim 1, wherein the particular grouping registration specifies what type of information the grouping notification provides.

9. The method of claim 8, wherein the grouping notification provides a summary of the plurality of events.

10. The method of claim 1, wherein the particular grouping registration specifies a time to begin grouping events that satisfy the one or more grouping criteria.

11. The method of claim 1, wherein the particular grouping registration specifies a number of times a different set of events are grouped and grouping notifications are sent to the one or more intended recipients.

12. The method of claim 1, further comprising:
for each occurrence of an event of the plurality of events, determining whether one or more completion criteria associated with any grouping registration, of a plurality of grouping registrations, have been satisfied; and
if one or more completion criteria associated with one or more grouping registrations, of the plurality of grouping registrations, have been satisfied, then, for each of the one or more grouping registrations, sending a grouping notification to the one or more intended recipients of said each of the one or more grouping registrations.

13. The method of claim 1, further comprising executing a plurality of slave processes, wherein:
each slave process of the plurality of slave processes may update grouping data associated with the particular grouping registration; and
a single process is designated as being allowed to send the grouping notification.

14. The method of claim 1, further comprising maintaining statistics for each registration of a plurality of registrations that have been received.

15. The method of claim 1, further comprising initiating a database procedure call in response to determining that the one or more completion criteria are satisfied.

16. A method comprising:
receiving, from an application, at a computing device, a request to be notified about occurrences of multiple specified events relative to a database;
storing information about occurrences of the multiple specified events instead of sending, to the application, a notification of the occurrence of each event of the multiple specified events;
receiving event information about occurrences of a plurality of events;
for a first event of the plurality of events:
determining whether said first event is for a grouping registration or a non-grouping registration, wherein determining whether said first event is for a grouping registration or a non-grouping registration comprises determining whether occurrence of said first event satisfies one or more grouping criteria associated with the request, and
in response to determining that occurrence of said first event satisfies the one or more grouping criteria, storing second information, about occurrence of said first event, in association with the request instead of sending a notification of the occurrence of said first event;
for a second event of the plurality of events:
determining whether said second event is for a grouping registration or a non-grouping registration,
in response to determining that said second event is for a non-grouping registration, sending a notification of said second event to one or more intended recipients associated with the non-grouping registration;
determining whether one or more completion criteria associated with the request have been satisfied;
in response to determining that the one or more completion criteria have been satisfied,
sending one of:
(a) data that summarizes the information, or
(b) data pertaining to only a most recent occurrence of an event within the multiple specified events;
wherein the method is performed by one or more computing devices.

17. One or more non-transitory machine-readable media storing instructions which, when executed by one or more processors, cause:
receiving a particular grouping registration from a registrant, wherein the particular grouping registration specifies one or more grouping criteria;
receiving event information about occurrences of a set of multiple events;
for a first event of the set of multiple events:
determining whether said first event is for a grouping registration or a non-grouping registration,
in response to determining that said first event is for a non-grouping registration, sending a notification of said first event to one or more intended recipients associated with the non-grouping registration, wherein details in the notification about said first event comprises a first level of detail;
for a second event of the set of multiple events:
determining whether said second event is for a grouping registration or a non-grouping registration, wherein determining whether said second event is for a grouping registration or a non-grouping registration comprises determining whether occurrence of said second event satisfies the one or more grouping criteria, and
in response to determining that occurrence of said second event satisfies the one or more grouping criteria, storing information, about occurrence of said second event, in association with the particular grouping registration instead of sending a notification of the occurrence of said second event;
wherein occurrence of each event of a plurality of events in the set of multiple events-satisfies the one or more grouping criteria;
determining whether one or more completion criteria, associated with the particular grouping registration, are satisfied; and
in response to determining that the one or more completion criteria are satisfied, sending a grouping notification to one or more intended recipients associated with the particular grouping registration;
wherein details in the grouping notification about said plurality of events comprises a second level of detail that is less than the first level of detail.

18. The one or more non-transitory machine-readable media of claim 17, wherein the registrant issued the grouping registration through an application or application server that is executing in conjunction with a relational database management server (RDBMS).

19. The one or more non-transitory machine-readable media of claim 17, wherein the one or more grouping criteria specifies at least one of time, transaction, event, or data size.

20. The one or more non-transitory machine-readable media of claim 17, wherein the particular grouping registration specifies the one or more completion criteria.

21. The one or more non-transitory machine-readable media of claim 17, wherein the one or more completion criteria are at least one of a length of time, a number of transactions, a number of bytes of one or more data objects, or a number of occurrences of an event.

22. The one or more non-transitory machine-readable media of claim 17, wherein the particular grouping registration specifies a time to begin grouping events that satisfy the one or more grouping criteria.

23. The one or more non-transitory machine-readable media of claim 17, wherein the instructions, when executed by the one or more processors, further cause initiating a database procedure call in response to determining that the one or more completion criteria are satisfied.

24. The one or more non-transitory machine-readable media of claim 17, wherein the grouping notification is sent without sending any individual notifications of any event of the plurality of events.

25. The one or more non-transitory machine-readable media of claim 17, wherein one of the one or more intended recipients is the registrant.

26. The one or more non-transitory machine-readable media of claim 17, wherein the particular grouping registration specifies what type of information the grouping notification provides.

27. The one or more non-transitory machine-readable media of claim 26, wherein the grouping notification provides a summary of the plurality of events.

28. The one or more non-transitory machine-readable media of claim 17, wherein the particular grouping registration specifies a number of times a different set of events are grouped and grouping notifications are sent to the one or more intended recipients.

29. The one or more non-transitory machine-readable media of claim 17, wherein the instructions, when executed by the one or more processors, further cause:
for each occurrence of an event of the plurality of events, determining whether one or more completion criteria associated with any grouping registration, of a plurality of grouping registrations, have been satisfied; and if one or more completion criteria associated with one or more grouping registrations, of the plurality of grouping registrations, have been satisfied, then, for each of the one or more grouping registrations, sending a grouping notification to the one or more intended recipients of said each of the one or more grouping registrations.

30. The one or more non-transitory machine-readable media of claim 17, wherein: the instructions, when executed by the one or more processors, further cause executing a plurality of slave processes; each slave process of the plurality of slave processes may update grouping data associated with the particular grouping registration; and a single process is designated as being allowed to send the grouping notification.

31. The one or more non-transitory machine-readable media of claim 17, wherein the instructions, when executed by the one or more processors, further cause maintaining statistics for each registration of a plurality of registrations that have been received.

32. One or more non-transitory machine-readable media storing instructions which, when executed by one or more processors, cause:
receiving, from an application, a request to be notified about occurrences of multiple specified events relative to a database;
storing information about occurrences of the multiple specified events instead of sending, to the application, a notification of the occurrence of each event of the multiple specified events;
receiving event information about occurrences of a plurality of events;
for a first event of the plurality of events:
determining whether said first event is for a grouping registration or a non-grouping registration, wherein determining whether said first event is for a grouping registration or a non-grouping registration comprises determining whether occurrence of said first event satisfies one or more grouping criteria associated with the request, and
in response to determining that occurrence of said first event satisfies the one or more grouping criteria, storing second information, about occurrence of said first event, in association with the request instead of sending a notification of the occurrence of said first event;
for a second event of the plurality of events:
determining whether said second event is for a grouping registration or a non-grouping registration,
in response to determining that said second event is for a non-grouping registration, sending a notification of said second event to one or more intended recipients associated with the non-grouping registration;
determining whether one or more completion criteria associated with the request have been satisfied;
in response to determining that the one or more completion criteria have been satisfied,
sending one of:
(a) data that summarizes the information, or
(b) data pertaining to only a most recent occurrence of an event within the multiple specified events.

* * * * *

UNITED STATES PATENT AND TRADEMARK OFFICE
CERTIFICATE OF CORRECTION

PATENT NO. : 8,065,365 B2  Page 1 of 1
APPLICATION NO. : 11/743276
DATED : November 22, 2011
INVENTOR(S) : Saxena et al.

It is certified that error appears in the above-identified patent and that said Letters Patent is hereby corrected as shown below:

In column 14, line 47, in Claim 1, delete "events-satisfies" and insert -- events satisfies --, therefor.

In column 16, line 54, in Claim 17, delete "events-satisfies" and insert -- events satisfies --, therefor.

Signed and Sealed this
Thirty-first Day of January, 2012

David J. Kappos
*Director of the United States Patent and Trademark Office*